(12) United States Patent
Jones (10) Patent No.: US 11,144,945 B2
(45) Date of Patent: Oct. 12, 2021

(54) METHOD, SYSTEM, AND COMPUTER PROGRAM PRODUCT FOR COMMUNICATING LOYALTY PROGRAM IDENTIFICATION DATA

(71) Applicant: Visa International Service Association, San Francisco, CA (US)

(72) Inventor: Christopher David Jones, Greenbrae, CA (US)

(73) Assignee: Visa International Service Association, San Francisco, CA (US)

(*) Notice: Subject to any disclaimer, the term of this patent is extended or adjusted under 35 U.S.C. 154(b) by 636 days.

(21) Appl. No.: 15/834,621

(22) Filed: Dec. 7, 2017

(65) Prior Publication Data
US 2019/0180310 A1 Jun. 13, 2019

(51) Int. Cl.
*G06Q 30/02* (2012.01)
*G06Q 20/36* (2012.01)

(52) U.S. Cl.
CPC ......... *G06Q 30/0226* (2013.01); *G06Q 20/36* (2013.01); *G06Q 30/0222* (2013.01)

(58) Field of Classification Search
None
See application file for complete search history.

(56) References Cited

U.S. PATENT DOCUMENTS

| | | | | |
|---|---|---|---|---|
| 2002/0062249 A1* | 5/2002 | Iannacci | ................ | G06Q 20/10 705/14.1 |
| 2011/0288923 A1* | 11/2011 | Steinert | .............. | G06Q 30/0226 705/14.25 |
| 2015/0199689 A1* | 7/2015 | Kumnick | ........... | G06Q 20/4016 705/67 |
| 2015/0248664 A1* | 9/2015 | Makhdumi | ........ | G06Q 20/3276 235/380 |
| 2016/0019536 A1* | 1/2016 | Ortiz | ...................... | G06Q 20/40 705/67 |
| 2016/0267455 A1 | 9/2016 | Rewis et al. | | |
| 2016/0314458 A1* | 10/2016 | Douglas | ............... | G06Q 20/363 |
| 2016/0358200 A1* | 12/2016 | Watanabe | .............. | G06Q 20/40 |
| 2018/0276654 A1 | 9/2018 | Chatterjee et al. | | |

* cited by examiner

*Primary Examiner* — Michael J Sittner
(74) *Attorney, Agent, or Firm* — The Webb Law Firm (57) ABSTRACT

A computer-implemented method for providing loyalty program identification data associated with a payment transaction may include receiving, with an electronic wallet system, loyalty program identification data associated with a customer; receiving, with the electronic wallet system, first transaction data associated with a payment transaction involving the customer and a merchant; assigning, with the electronic wallet system, the loyalty program identification data to the first transaction data based on receiving the first transaction data; receiving, with the electronic wallet system, second transaction data associated with the payment transaction, wherein the second transaction data is received after the first transaction data is received; determining, with the electronic wallet system, whether the second transaction data corresponds to the first transaction data; and communicating, with the electronic wallet system, the loyalty program identification data based on determining that the second transaction data corresponds to the first transaction data. A system and computer program product are also discussed.

11 Claims, 5 Drawing Sheets

METHOD, SYSTEM, AND COMPUTER PROGRAM PRODUCT FOR COMMUNICATING LOYALTY PROGRAM IDENTIFICATION DATA

BACKGROUND OF THE INVENTION

1. Field of the Invention

This invention relates generally to systems for communicating data related to payment transactions and, in one particular embodiment, to a method, system, and computer program product for communicating loyalty program identification data associated with a payment transaction.

2. Technical Considerations

A loyalty rewards program may be part of a structured marketing strategy for encouraging customers to provide business to a company or affiliates of the company. For example, a customer may be issued a loyalty card (e.g., a physical loyalty card and/or a digital loyalty card) which includes a loyalty rewards program identifier associated with the customer. The customer may present the loyalty card to a merchant that issued the loyalty card when the customer engages in a payment transaction with a merchant. The customer may present the loyalty card to obtain a benefit provided by the merchant as part of the loyalty rewards program.

When the customer engages in a payment transaction with the merchant, the merchant's point-of-sale (POS) device may communicate transaction data associated with the transaction to a transaction service provider to process the transaction. However, the merchant's POS device may not be able to communicate a loyalty rewards program identifier associated with the customer to the transaction service provider. Accordingly, the transaction service provider may not be able to assign the loyalty rewards program identifier to the transaction data associated with the payment transaction. Therefore, the transaction service provider may not be able to operate the loyalty rewards program effectively.

Additionally, since the transaction service provider may not be able to operate the loyalty rewards program effectively, a merchant may be required to operate the loyalty rewards program. However, the merchant may incur expenses associated with operating the loyalty rewards program. For example, the merchant may incur expenses associated with operating a database that stores loyalty program identification data associated with a customer who is enrolled in the loyalty rewards program.

Further, due to a growing number of merchants issuing loyalty rewards cards, it can often be troublesome for a customer to keep track of numerous rewards cards, and this may cause a customer to miss out on certain opportunities to participate in a loyalty rewards program, if, for example, a loyalty rewards card is misplaced or forgotten when a transaction takes place.

SUMMARY OF THE INVENTION

Accordingly, it is an object of the present invention to provide a method, system, and computer program product for communicating loyalty program identification data that overcomes some or all of the deficiencies in the prior art.

According to non-limiting embodiments, provided is a computer-implemented method for communicating loyalty program identification data associated with at least one payment transaction, comprising: receiving, with at least one processor of an electronic wallet system, loyalty program identification data associated with loyalty program identifier of a customer; receiving, with at least one processor of the electronic wallet system, first transaction data associated with at least one payment transaction involving the customer and a merchant; assigning, with at least one processor of the electronic wallet system, the loyalty program identification data associated with the customer to the first transaction data based on receiving the first transaction data; receiving, with at least one processor of the electronic wallet system, second transaction data associated with the at least one payment transaction involving the customer and the merchant, wherein the second transaction data is received after the first transaction data is received; determining, with at least one processor of the electronic wallet system, whether the second transaction data corresponds to the first transaction data; and communicating, with at least one processor of the electronic wallet system, the loyalty program identification data based on determining that the second transaction data corresponds to the first transaction data.

According to non-limiting embodiments, provided is a system for communicating loyalty program identification data associated with at least one payment transaction, comprising: an electronic wallet system comprising at least one processor configured or programmed to: receive loyalty program identification data associated with a loyalty program identifier of a customer; receive first transaction data associated with at least one payment transaction involving the customer and a merchant after receiving the loyalty program identification data associated with the loyalty program identifier of the customer; assign the loyalty program identification data to the first transaction data based on receiving the first transaction data; receive second transaction data associated with the at least one payment transaction involving the customer and the merchant, wherein the second transaction data is received after the first transaction data is received; determine that the second transaction data corresponds to the first transaction data; and communicate the loyalty program identification data.

According to non-limiting embodiments, provided is a computer program product for communicating loyalty program identification data associated with at least one payment transaction, the computer program product comprising at least one non-transitory computer-readable medium including one or more instructions that, when executed by at least one processor, cause the at least one processor to: receive loyalty program identification data associated with a loyalty program identifier for a customer; receive first transaction data associated with at least one payment transaction involving the customer and a merchant; assign the loyalty program identification data to the first transaction data based on receiving the first transaction data; receive second transaction data associated with the at least one payment transaction involving the customer and the merchant, wherein the second transaction data is received after the first transaction data is received; determine that the second transaction data corresponds to the first transaction data; and communicate the loyalty program identification data based on determining that the second transaction data corresponds to the first transaction data.

Further embodiments or aspects are set forth in the following numbered clauses:

Clause 1: A computer-implemented method for communicating loyalty program identification data associated with at least one payment transaction, comprising: receiving, with at least one processor of an electronic wallet system, loyalty program identification data associated with loyalty program identifier of a customer; receiving, with at least one processor of the electronic wallet system, first transaction data associated with at least one payment transaction involving the customer and a merchant; assigning, with at least one processor of the electronic wallet system, the loyalty program identification data associated with the customer to the first transaction data based on receiving the first transaction data; receiving, with at least one processor of the electronic wallet system, second transaction data associated with the at least one payment transaction involving the customer and the merchant, wherein the second transaction data is received after the first transaction data is received; determining, with at least one processor of the electronic wallet system, whether the second transaction data corresponds to the first transaction data; and communicating, with at least one processor of the electronic wallet system, the loyalty program identification data based on determining that the second transaction data corresponds to the first transaction data.

Clause 2: The computer-implemented method of clause 1, wherein receiving the second transaction data comprises: receiving the second transaction data associated with the at least one payment transaction involving the customer and the merchant from a token service provider system; and wherein determining whether the second transaction data corresponds to the first transaction data comprises: comparing the second transaction data to the first transaction data based on receiving the second transaction data.

Clause 3: The computer-implemented method of clauses 1 or 2, further comprising: storing the loyalty program identification data associated with the loyalty program identifier of the customer and the first transaction data in a data structure based on assigning the loyalty program identification data to the first transaction data.

Clause 4: The computer-implemented method of any of clauses 1-3, wherein communicating the loyalty program identification data comprises: communicating the loyalty program identification data to a transaction service provider system after determining that the second transaction data corresponds to the first transaction data.

Clause 5: The computer-implemented method of any of clauses 1-4, wherein the first transaction data comprises a transaction identifier of the at least one payment transaction and the second transaction data comprises the transaction identifier of the at least one payment transaction.

Clause 6: The computer-implemented method of any of clauses 1-5, wherein communicating the loyalty program identification data comprises: communicating the loyalty program identification data from the electronic wallet system to a token service provider system after determining that the second transaction data corresponds to the first transaction data.

Clause 7: The computer-implemented method of any of clauses 1-6, wherein the first transaction data comprises at least one of the following: a device-bound token, a merchant-bound token, or any combination thereof.

Clause 8: A system for communicating loyalty program identification data associated with at least one payment transaction, comprising: an electronic wallet system comprising at least one processor configured or programmed to: receive loyalty program identification data associated with a loyalty program identifier of a customer; receive first transaction data associated with at least one payment transaction involving the customer and a merchant after receiving the loyalty program identification data associated with the loyalty program identifier of the customer; assign the loyalty program identification data to the first transaction data based on receiving the first transaction data; receive second transaction data associated with the at least one payment transaction involving the customer and the merchant, wherein the second transaction data is received after the first transaction data is received; determine that the second transaction data corresponds to the first transaction data; and communicate the loyalty program identification data.

Clause 9: The system of clause 8, wherein, when communicating the loyalty program identification data, the at least one processor is configured or programmed to: communicate the loyalty program identification data to a token service provider system.

Clause 10: The system of clauses 8 or 9, wherein at least one processor is further configured or programmed to: store the loyalty program identification data associated with the loyalty program identifier of the customer and the first transaction data in a data structure based on assigning the loyalty program identification data to the first transaction data.

Clause 11: The system of any of clauses 8-10, wherein, when communicating the loyalty program identification data, the at least one processor is configured or programmed to: communicate the loyalty program identification data and the first transaction data to a token provider system based on determining that the second transaction data corresponds to the first transaction data.

Clause 12: The system of any of clauses 8-11, wherein the first transaction data comprises a transaction identifier of the at least one payment transaction and/or the second transaction data comprises the transaction identifier of the at least one payment transaction.

Clause 13: The system of any of clauses 8-12, wherein, when communicating the loyalty program identification data, the at least one processor is configured or programmed to: communicate the loyalty program identification data and the first transaction data to a transaction service provider system based on determining that the second transaction data corresponds to the first transaction data.

Clause 14: The system of any of clauses 8-13, wherein the at least one processor is configured or programmed to: communicate the loyalty program identification data to a transaction service provider system based on determining that the second transaction data corresponds to the first transaction data.

Clause 15: A computer program product for communicating loyalty program identification data associated with at least one payment transaction, the computer program product comprising at least one non-transitory computer-readable medium including one or more instructions that, when executed by at least one processor, cause the at least one processor to: receive loyalty program identification data associated with a loyalty program identifier for a customer; receive first transaction data associated with at least one payment transaction involving the customer and a merchant; assign the loyalty program identification data to the first transaction data based on receiving the first transaction data; receive second transaction data associated with the at least one payment transaction involving the customer and the merchant, wherein the second transaction data is received after the first transaction data is received; determine that the second transaction data corresponds to the first transaction data; and communicate the loyalty program identification data based on determining that the second transaction data corresponds to the first transaction data.

Clause 16: The computer program product of clause 15, wherein the one or more instructions, when executed by the at least one processor, further cause the at least one processor to: store the loyalty program identification data associated with the loyalty program identifier of the customer and the first transaction data in a data structure based on assigning the loyalty program identification data to the first transaction data.

Clause 17: The computer program product of clauses 15 or 16, wherein the one or more instructions, that cause the at least one processor to communicate the loyalty program identification data, cause the at least one processor to: communicate, via an application on a customer device associated with the customer, the loyalty program identification data and the first transaction data to a transaction service provider system based on determining that the second transaction data corresponds to the first transaction data.

Clause 18: The computer program product of any of clauses 15-17, wherein the first transaction data comprises a transaction identifier of the at least one payment transaction and/or the second transaction data comprises the transaction identifier of the at least one payment transaction.

Clause 19: The computer program product of any of clauses 15-18, wherein the first transaction data comprises at least one of the following: a device-bound token, a merchant-bound token, or any combination thereof.

Clause 20: The computer program product of any of clauses 15-19, wherein the one or more instructions, that cause the at least one processor to receive the second transaction data associated with the at least one payment transaction, cause the at least one processor to: receive the second transaction data associated with the at least one payment transaction involving the customer and the merchant from a token service provider system after the token service provider system receives the second transaction data.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument (e.g., a payment card), and/or may be electronic and used for electronic payments. In some non-limiting embodiments, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "account identifier" may refer to one or more types of identifiers associated with a user account (e.g., an account identifier, a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token (e.g., a merchant bound token, a device bound token, and/or the like) may be used as a substitute or replacement identifier for an original account identifier. In some non-limiting embodiments, a merchant bound token may include a token that is configured to allow for a payment transaction to be conducted only (e.g., exclusively) with the merchant associated with the token. In some non-limiting embodiments, a device bound token may include a token that is configured to allow for a payment transaction to be conducted only (e.g., exclusively) with the device (e.g., a customer device) associated with the token. Tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "POS device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "POS system" may refer to one or more computers and/or peripheral devices used by a merchant to conduct a transaction. For example, a POS system may include one or more POS devices, and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant (PDA), a pager, a security card, a computer, an access card, a wireless terminal, and/or a transponder, as examples. The portable financial device may include volatile or non-volatile memory to store information (e.g., an account identifier, a name of the account holder, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a customer, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices, such as but not limited to processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "token service provider" may refer to an entity that provides a token (e.g., a payment token) that may serve as a surrogate for customer account credentials to a registered token requester (e.g., a merchant holding customer account credentials).

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

Non-limiting embodiments of the present invention may allow loyalty program identification data associated with a loyalty program identifier of a loyalty rewards program to be communicated to a transaction service provider. Accordingly, the transaction service provider may be able to assign loyalty program identification data to transaction data associated with a transaction and operate a loyalty rewards program more effectively than a case where a POS device associated with a merchant cannot communicate loyalty program identification data to a transaction service provider. Non-limiting embodiments of the present invention may also allow a merchant to avoid incurring expenses associated with operating the loyalty rewards program. In addition, a customer may be able to take advantage of additional opportunities to participate in a loyalty rewards program. For example, it may not be necessary for a customer to carry a loyalty card associated with a loyalty rewards program or to present the loyalty card to a merchant to receive benefits of the loyalty rewards program when conducting payment transactions with a merchant associated with the loyalty rewards program.

Figure 1:
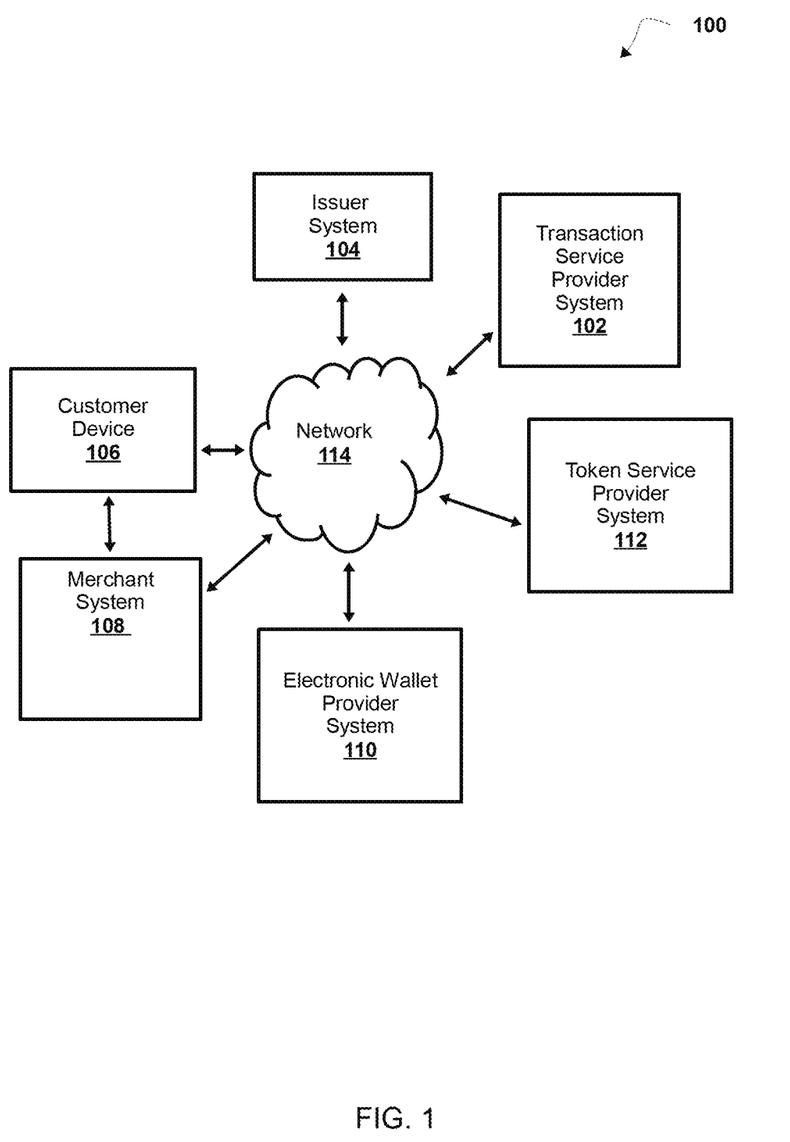
FIG. 1 is a diagram of a non-limiting embodiment of an environment in which systems, apparatus, and/or methods, as described herein, may be implemented.

Referring now to FIG. 1, FIG. 1 is a diagram of a non-limiting embodiment of an environment 100 in which systems, apparatus, and/or methods, as described herein, may be implemented. As shown in FIG. 1, environment 100 may include transaction service provider system 102, issuer system 104, customer device 106, merchant system 108, electronic wallet provider system 110, and/or token service provider system 112.

Transaction service provider system 102 may include one or more devices capable of receiving information from and/or communicating information to issuer system 104, customer device 106, merchant system 108, electronic wallet provider system 110, and/or token service provider system 112 via network 114. For example, transaction service provider system 102 may include one or more computing devices, such as a server, a group of servers, and/or the like. In some non-limiting embodiments, transaction service provider system 102 may be associated with an entity (e.g., a transaction service provider) that operates a credit card network and that processes payments for credit accounts, debit accounts, credit cards, debit cards, and/or the like.

Issuer system 104 may include one or more devices capable of receiving information from and/or communicating information to transaction service provider system 102, customer device 106, merchant system 108, electronic wallet provider system 110, and/or token service provider system 112 via network 114. For example, issuer system 104 may include one or more computing devices, such as a server, a group of servers, and/or the like. In some non-limiting embodiments, the issuer system 104 may be associated with an issuer institution as described herein. In some non-limiting embodiments, issuer system 104 may be associated with an issuer institution that issued a credit account, debit account, credit card, debit card, and/or the like to a user (e.g., a customer) associated with customer device 106.

Customer device 106 may include one or more devices capable of receiving information from and/or communicating information to transaction service provider system 102, issuer system 104, merchant system 108, electronic wallet provider system 110, and/or token service provider system 112 via network 114. For example, customer device 106 may include a client device. In some non-limiting embodiments, customer device 106 may or may not be capable of receiving information (e.g., from merchant system 108) via a short range wireless communication connection (e.g., an NFC communication connection, an RFID communication connection, a Bluetooth® communication connection, and/or the like) and/or communicating information (e.g., to merchant system 108) via a short range wireless communication connection. For example, customer device 106 may not be capable of receiving data from merchant system 108 via an NFC communication connection and/or communicating data to merchant system 108 via an NFC communication connection. In some non-limiting embodiments, customer device 106 may be capable of conducting (e.g., engaging in) a payment transaction with merchant system 108, where customer device 106 may receive data (e.g., payment method data) and/or communicate data (e.g., payment method data) independent of a short range wireless communication connection.

Merchant system 108 may include one or more devices capable of receiving information from and/or communicating information to transaction service provider system 102, issuer system 104, customer device 106, electronic wallet provider system 110, and/or token service provider system 112 via network 114. For example, merchant system 108 may include a computing device, such as a server, a group of servers, a client device, a group of client devices, and/or other like devices. Additionally or alternatively, merchant system 108 may include a device capable of receiving information from customer device 106 via network 114, a communication connection (e.g., an NFC communication connection, an RFID communication connection, a Bluetooth® communication connection, and/or the like) with customer device 106, and/or the like and/or communicating information to customer device 106 via the network, the communication connection, and/or the like. In some non-limiting embodiments, merchant system 108 may be associated with a merchant as described herein. In some non-limiting embodiments, merchant system 108 may include one or more customer devices 106. For example, merchant system 108 may include customer device 106 that allows a merchant to communicate information to transaction service provider system 102. In some non-limiting embodiments, merchant system 108 may include one or more devices, such as computers, computer systems, and/or peripheral devices capable of being used by a merchant to conduct a payment transaction with a user. For example, merchant system 108 may include a POS device and/or a POS system.

Electronic wallet provider system 110 may include one or more devices capable of receiving information from and/or communicating information to transaction service provider system 102, issuer system 104, customer device 106, electronic wallet provider system 110, and/or token service provider system 112 via network 114. For example, electronic wallet provider system 110 may include one or more computing devices, such as a server, a group of servers, and/or the like. In some non-limiting embodiments, electronic wallet provider system 110 may be associated with an electronic wallet provider as described herein. In some non-limiting embodiments, electronic wallet provider system 110 may include a server (e.g., an electronic wallet provider server) associated with an electronic wallet provider and a customer device 106 that includes an application (e.g., an electronic wallet mobile application) associated with the electronic wallet provider. For example, customer device 106 may include the application and customer device 106 may communicate information received by customer device 106 (e.g., from a customer associated with customer device 106) via the application to the server.

Token service provider system 112 may include one or more devices receiving information from and/or communicating information to transaction service provider system 102, issuer system 104, customer device 106, and/or electronic wallet provider system 110 via network 114. For example, merchant system 108 may include a computing device, such as a server, a group of servers, a client device, a group of client devices, and/or other like devices. In some non-limiting embodiments, token service provider system 112 may be associated with a token service provider as described herein.

Network 114 may include one or more wired and/or wireless networks. For example, network 114 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., a public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

Figure 2:
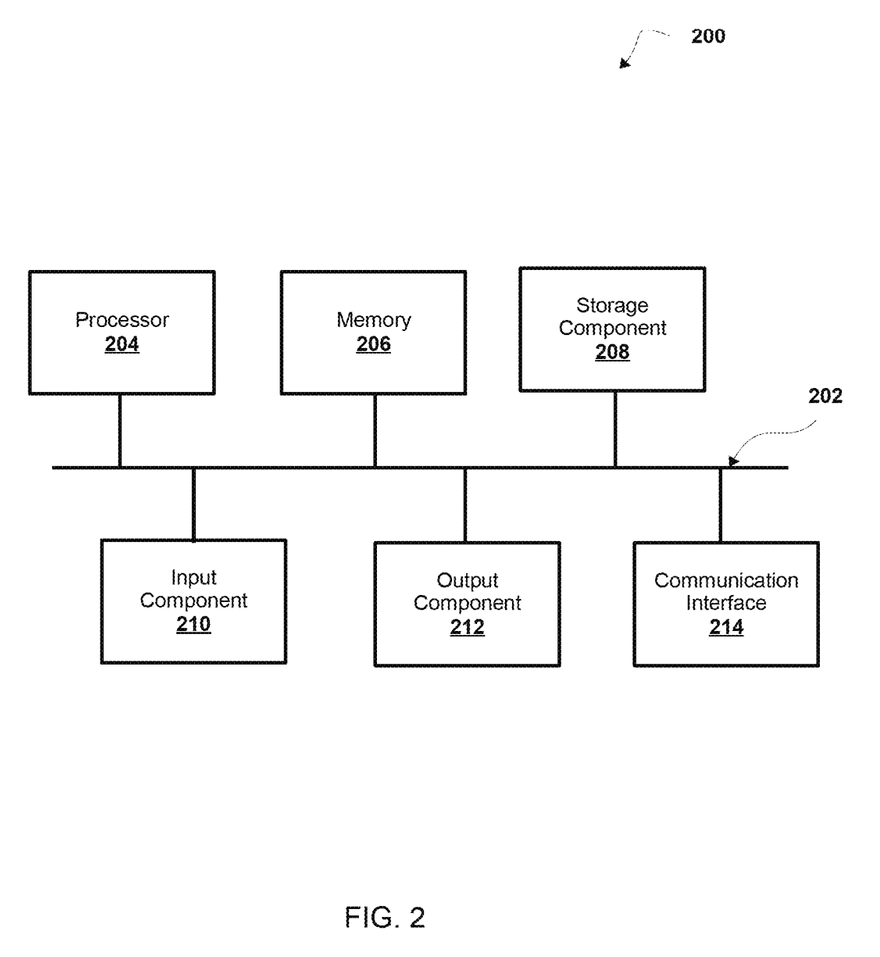
FIG. 2 is a diagram of a non-limiting embodiment of components of one or more devices of FIG. 1.

Referring now to FIG. 2, FIG. 2 is a diagram of example components of a device 200. In non-limiting embodiments, device 200 may correspond to one or more devices of transaction service provider system 102, one or more devices of issuer system 104, customer device 106, one or more devices of electronic wallet provider system 110, and/or one or more devices of token service provider system 112. In some non-limiting embodiments, transaction service provider system 102, issuer system 104, customer device 106, electronic wallet provider system 110, and/or token service provider system 112 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
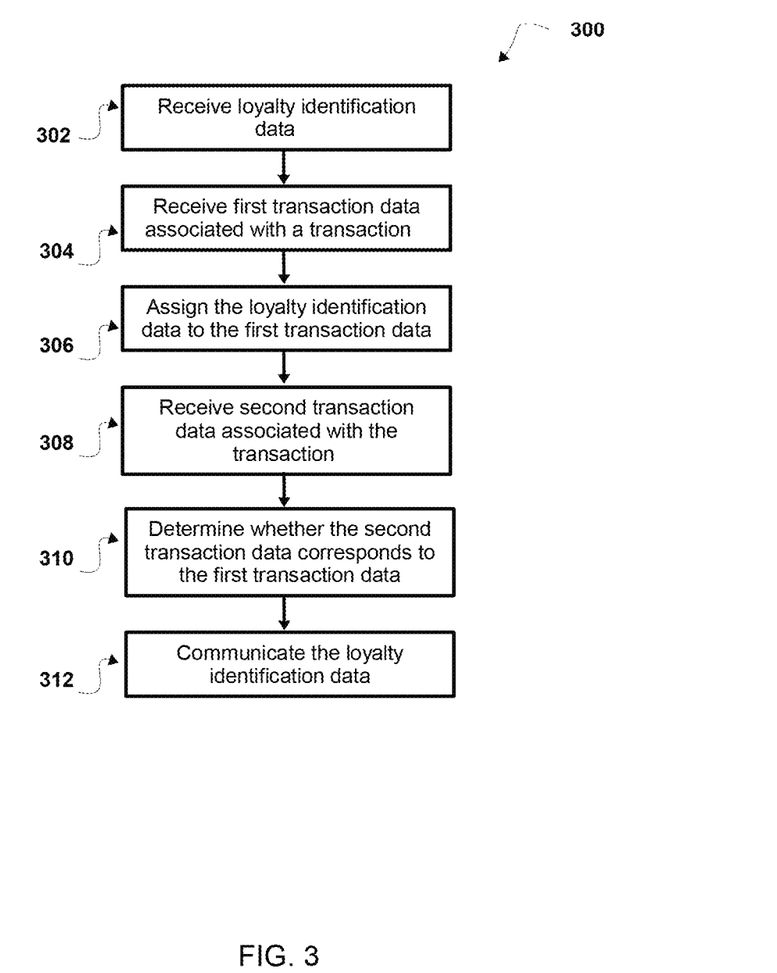
FIG. 3 is a flowchart illustrating a non-limiting embodiment of a method for communicating loyalty program identification data in accordance with principles of the invention.

Referring now to FIG. 3, FIG. 3 is a flowchart of a non-limiting embodiment of a method 300 for communicating loyalty program identification data. In some non-limiting embodiments, one or more of the steps of method 300 may be performed (e.g., completely, partially, and/or the like) by electronic wallet provider system 110. In some non-limiting embodiments, one or more of the steps of method 300 may be performed (e.g., completely, partially, and/or the like) by another system, another device, another group of systems, or another group of devices, separate from or including electronic wallet provider system 110, such as transaction service provider system 102 (e.g., one or more devices of transaction service provider system 102), issuer system 104 (e.g., one or more devices of issuer system 104), customer device 106, merchant system 108 (e.g., one or more devices of merchant system 108), or token service provider system 112 (e.g., one or more devices of token service provider system 112).

As shown in FIG. 3, at step 302, method 300 includes receiving loyalty program identification data. For example, electronic wallet provider system 110 may receive loyalty program identification data from a customer associated with customer device 106. In some non-limiting embodiments, loyalty program identification data may include data associated with a loyalty program identifier. For example, loyalty program identification data may include a loyalty program identifier, a portion of a loyalty program identifier, a type of loyalty program identifier, a code for a loyalty program identifier, a link to a loyalty program identifier, and/or the like. In some non-limiting embodiments, a loyalty program identifier may include an identifier that identifies an account of a customer in a loyalty rewards program. For example, a loyalty program identifier may include a unique identifier, a user name, an account number, an alpha numeric code, and/or the like.

In some non-limiting embodiments, the loyalty program identifier may be included on a loyalty rewards card and/or the like. In some non-limiting embodiments, the loyalty program identifier may include electronically stored data. For example, the loyalty program identifier may include electronic data stored on customer device 106 and/or electronic wallet provider system 110. In some non-limiting embodiments, customer device 106 may scan a loyalty rewards card to receive loyalty program identification data associated with the loyalty program identifier.

In some non-limiting embodiments, electronic wallet provider system 110 (e.g., via an application associated with electronic wallet provider located on customer device 106) may receive the loyalty program identification data from a customer associated with customer device 106. For example, electronic wallet provider system 110 may receive the loyalty program identification data based on customer device 106 receiving a manual input from the customer. In such an example, the manual input may include the loyalty program identification data.

In some non-limiting embodiments, electronic wallet provider system 110 may receive the loyalty program identification data based on the customer selecting (e.g., manually selecting) a loyalty rewards program associated with a merchant from a plurality of loyalty rewards programs associated with a plurality of merchants. For example, electronic wallet provider system 110 may cause customer device 106 to display a user interface that includes a list of a plurality of loyalty rewards programs via an application associated with electronic wallet provider system 110 located on customer device 106. The list may include a plurality of user selectable elements associated with the plurality of loyalty rewards programs. Each loyalty rewards program in the list may be associated with a user selectable element. The user selectable element may be configured such that when a user selectable element is activated by the customer, customer device 106 communicates, via the application, loyalty program identification data for the loyalty rewards program associated with the user selectable element that was activated.

In some non-limiting embodiments, electronic wallet provider system 110 may receive the loyalty program identification data automatically (e.g., without a manual input from a customer associated with customer device 106). In this way, electronic wallet provider system 110 may conserve processor resources compared to receiving loyalty program identification data based on a manual input from a customer associated with customer device 106.

In some non-limiting embodiments, electronic wallet provider system 110 may receive the loyalty program identification data based on an application-to-application push technique, application geo-location, and/or the like. In one example, electronic wallet provider system 110 may receive the loyalty program identification data when an application (e.g., an electronic wallet provider application) stored on customer device 106 receives a push notification from an application associated with merchant system 108. In another example, electronic wallet provider system 110 may receive the loyalty program identification data when an application (e.g., an electronic wallet provider application) stored on customer device 106 determines that customer device 106 is in proximity to (e.g., inside of, within a predetermined distance of, and/or the like) a merchant location associated with merchant system 108.

In some non-limiting embodiments, electronic wallet provider system 110 may receive loyalty program identification data based on customer device 106 receiving a signal from a beacon (e.g., a transmitter, a transceivers, Bluetooth transmitter, and/or the like) located at a merchant location associated with merchant system 108. In some non-limiting embodiments, customer device 106 may receive a signal from the beacon when customer device 106 is in proximity to the merchant location. Customer device 106 may assign (e.g., map, automatically assign, automatically map, and/or the like) loyalty program identification data (e.g., loyalty program identification data associated with a loyalty program identifier of a loyalty rewards program associated with merchant system 108) to an account identifier and/or a transaction identifier based on receiving the signal from the beacon. In some non-limiting embodiments, electronic wallet provider system 110 may receive the loyalty program identification data based on customer device 106 assigning the loyalty program identification data.

In some non-limiting embodiments, electronic wallet provider system 110 and/or customer device 106 may communicate loyalty program identification data (e.g., a loyalty program identifier, a link to a loyalty program identifier, a code for a loyalty program identifier, and/or the like) associated with a loyalty program identifier to transaction service provider system 102 (e.g., before a payment transaction is conducted involving merchant system 108). For example, electronic wallet provider system 110 and/or customer device 106 may communicate the loyalty program identification data associated with the loyalty program identifier to token service provider system 112 and token service provider system 112 may communicate the loyalty program identification data to transaction service provider system 102.

In some non-limiting embodiments, electronic wallet provider system 110 may receive the loyalty program identification data before or after a customer associated with customer device 106 conducts a payment transaction with merchant system 108. For example, electronic wallet provider system 110 may receive the loyalty program identification data before conducting a payment transaction based on the customer selecting the loyalty program identification data to be used during the payment transaction involving a merchant associated with merchant system 108. In some non-limiting embodiments, electronic wallet provider system 110 may assign (e.g., map, automatically assign, automatically map, and/or the like) the loyalty program identification data to one or more merchants (e.g., one or more merchants associated with one or more merchant systems 108) based on receiving the selection of the loyalty program identification data to be used during a payment transaction associated with a merchant. For example, electronic wallet provider system 110 may assign the loyalty program identification data to a first merchant and/or a second merchant. In another example, electronic wallet provider system 110 may assign first loyalty program identification data to a first merchant and second loyalty program identification data to a second merchant based on receiving selections of the user for the first loyalty program identification data and the second loyalty program identification data. In some non-limiting embodiments, electronic wallet provider system 110 may assign the loyalty program identification data to a type of payment transaction (e.g., an online payment transaction, a card present payment transaction, a face-to-face payment transaction, and/or the like) and/or to an account identifier associated with an account of a customer.

In some non-limiting embodiments, electronic wallet provider system 110 may receive loyalty program identification data based on customer device 106 receiving data from one or more electronic devices capable of perceiving loyalty program identification data which may be provided on a physical medium (e.g., a loyalty rewards card, a placard, a sign, and/or the like). In some non-limiting embodiments, the one or more electronic devices may include one or more cameras, card readers (e.g., magnetic stripe readers, Weigand card readers, proximity card readers, and/or the like), barcode readers, 2D barcode readers, NFC receivers, RFID receivers, microphones and/or other contactless receivers, contact-based receivers, input devices, and/or other like devices.

In some non-limiting embodiments, electronic wallet provider system 110 may store loyalty program identification data. For example, electronic wallet provider system 110 may store the loyalty program identification data on customer device 106 via an application on customer device 106 and/or on a server (e.g., an electronic wallet provider server associated with electronic wallet provider system 110).

In some non-limiting embodiments, electronic wallet provider system 110 may receive the loyalty program identification data based on customer device 106 receiving loyalty program identification data via one or more wired and/or wireless networks (e.g., network 114). For example, customer device 106 may receive loyalty program identification data from merchant system 108 via network 114.

As further shown in FIG. 3, at step 304, method 300 includes receiving first transaction data associated with a payment transaction. For example, electronic wallet provider system 110 may receive the first transaction data associated with a payment transaction via an application located on customer device 106. In some non-limiting embodiments, electronic wallet provider system 110 may receive first transaction data associated with a payment transaction between a customer and a merchant associated with merchant system 108. For example, the customer associated with customer device 106 may engage in a payment transaction with the merchant and electronic wallet provider system 110 may receive the first transaction data associated with the payment transaction from customer device 106 via an application located on customer device 106. In another example, electronic wallet provider system 110 may receive first transaction data associated with the payment transaction from merchant system 108 (e.g., a POS device associated with merchant system 108).

In some non-limiting embodiments, transaction data (e.g., first transaction data) associated with the payment transaction may include transaction amount data associated with a transaction amount of the payment transaction (e.g., a transaction amount, an overall transaction amount, a cost of each product involved, and/or the like), transaction identifier data associated with an identifier of the payment transaction (e.g., a reference number, a unique identifier, a transaction identifier, a transaction ID, a unique transaction identifier (UTI), a merchant identifier, a merchant order identifier, a merchant order identification number, a POS device identifier, and/or the like), transaction product data associated with a product involved in the payment transaction (e.g., a name of the product, a name of a type of product, a stock keeping unit (SKU) number associated with a product, a merchant code associated with a product, and/or the like), transaction time data associated with a time of the payment transaction (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like, and/or the like), transaction type data associated with a transaction type of the payment transaction (e.g., an online transaction, a card present transaction, a face-to-face transaction, and/or the like), and/or the like.

In some non-limiting embodiments, electronic wallet provider system 110 may receive transaction data (e.g., first transaction data) before, during, and/or after a payment transaction is conducted involving a customer associated with customer device 106 and a merchant associated with merchant system 108. In some non-limiting embodiments, the first transaction data may include transaction identifier data associated with an identifier of a payment transaction assigned by transaction service provider system 102, issuer system 104, customer device 106, merchant system 108, electronic wallet provider system 110, and/or token service provider system 112. In some non-limiting embodiments, electronic wallet provider system 110 may store the first transaction data in a data structure. For example, electronic wallet provider system 110 (e.g., a server associated with electronic wallet provider system 110) may store the first transaction data in a data structure associated with electronic wallet provider system 110. In another example, electronic wallet provider system 110 (e.g., a server associated with electronic wallet provider system 110) may store the first transaction data in a data structure associated with customer device 106 based on an application associated with electronic wallet provider system 110 located on customer device 106.

In some non-limiting embodiments, electronic wallet provider system 110 may receive first transaction data based on customer device 106 receiving the first transaction data from a POS device associated with merchant system 108. For example, customer device 106 may receive first transaction identifier data associated with the payment transaction via a short range communication connection between customer device 106 and the POS device. Customer device 106 may communicate the first transaction identifier data to a server (e.g., an electronic wallet provider server) associated with electronic wallet provider system 110 via an application associated with electronic wallet provider system 110 located on customer device 106. The server may receive the first transaction identifier data based on customer device 106 communicating the first transaction data.

In some non-limiting embodiments, merchant system 108 may communicate the first transaction data to transaction service provider system 102 based on a customer associated with customer device 106 conducting a payment transaction with a merchant associated with merchant system 108. For example, merchant system 108 may communicate the first transaction data (e.g., first transaction identifier data) associated with the payment transaction so that transaction service provider system 102 may process the payment transaction. In some non-limiting embodiments, merchant system 108 may communicate the first transaction data to token service provider system 112 based on a customer associated with customer device 106 conducting a payment transaction with a merchant associated with merchant system 108. For example, merchant system 108 may communicate the first transaction data (e.g., first transaction identifier data) associated with the payment transaction so that token service provider system 112 may communicate the first transaction data to transaction service provider system 102 for processing the payment transaction.

In some non-limiting embodiments, the first transaction data received by electronic wallet provider system 110 from merchant system 108 may be the same as the first transaction data communicated by merchant system 108 to transaction service provider system 102. In some non-limiting embodiments, the first transaction data received by electronic wallet provider system 110 from merchant system 108 may be different from the first transaction data communicated by merchant system 108 to transaction service provider system 102.

In some non-limiting embodiments, the first transaction data may include a token associated with an account of a customer associated with customer device 106. For example, the token may be a device-bound token associated with customer device 106 and/or the token may be a merchant-bound token associated with merchant system 108. In some non-limiting embodiments, the first transaction data may include a device-bound token assigned by token service provider system 112 to serve as a surrogate for an account identifier (e.g., a PAN) in payment transactions involving a customer associated customer device 106 and/or may include a merchant-bound token assigned by token service provider system 112 to serve as a surrogate for an account identifier in payment transactions involving a merchant associated with merchant system 108 and a customer associated with customer device 106.

As further shown in FIG. 3, at step 306, method 300 includes assigning the loyalty program identification data to the first transaction data. For example, electronic wallet provider system 110 may assign (e.g., map, automatically assign, automatically map, and/or the like) the loyalty program identification data associated with a loyalty identifier of a loyalty rewards program to the first transaction data. In some non-limiting embodiments, electronic wallet provider system 110 may assign the loyalty program identification data to the first transaction data in a data structure (e.g., a database and/or the like) associated with electronic wallet provider system 110 and/or customer device 106. For example, electronic wallet provider system 110 may assign the loyalty program identification data to the first transaction data in the data structure based on receiving the first transaction data and/or based on receiving the loyalty program identification data. In some non-limiting embodiments, the data structure may be operated by and/or accessible by electronic wallet provider system 110. Additionally or alternatively, the data structure may be accessible by transaction service provider system 102, issuer system 104, customer device 106, merchant system 108, and/or token service provider system 112 via network 114. For example, the data structure may be accessible by an entity other than electronic wallet provider system 110 based on a permission structure (e.g., a user account, a password, and/or the like).

In some non-limiting embodiments, electronic wallet provider system may be configured to disallow the assigning of transaction data to a loyalty identification associated with a loyalty rewards program of a particular merchant until a signal has been received from a particular beacon associated with that merchant, for example, in order to prevent or discourage transaction data which is not associated with the merchant operating a loyalty rewards program from mistakenly or fraudulently being associated with loyalty program identification data for that merchant.

As further shown in FIG. 3, at step 308, method 300 includes receiving second transaction data associated with the payment transaction. For example, electronic wallet provider system 110 may receive second transaction data associated with a payment transaction. In some non-limiting embodiments, electronic wallet provider system 110 may receive the second transaction data from transaction service provider system 102, issuer system 104, customer device 106, merchant system 108, and/or token service provider system 112 via network 114. For example, electronic wallet provider system 110 may receive the second transaction data from token service provider system 112 based on token service provider system 112 receiving the second transaction data from transaction service provider system 102.

In some non-limiting embodiments, electronic wallet provider system 110 may receive the same second transaction data from token service provider system 112 that the transaction service provider system 102 communicates to token service provider system 112. In some non-limiting embodiments, electronic wallet provider system 110 may receive different second transaction data from token service provider system 112 than the second transaction data that transaction service provider system 102 communicates to token service provider system 112.

In some non-limiting embodiments, transaction service provider system 102 may communicate the second transaction data to token service provider system 112 based on transaction service provider system 102 processing a payment transaction associated with the second transaction data. For example, transaction service provider system 102 may communicate the second transaction data to token service provider system 112 after processing the payment transaction.

In some non-limiting embodiments, the second transaction data may include a token associated with an account of a customer associated with customer device 106. For example, the token may be a device-bound token associated with customer device 106 and/or the token may be a merchant-bound token associated with merchant system 108. In some non-limiting embodiments, the second transaction data may include a device-bound token assigned by token service provider system 112 to serve as a surrogate for an account identifier in payment transactions involving a customer associated with customer device 106 and/or may include a merchant-bound token assigned by token service provider system 112 to serve as a surrogate for an account identifier in payment transactions involving a merchant associated with merchant system 108.

By the first transaction data and/or the second transaction data including a token, electronic wallet provider system 110 may avoid communicating sensitive data, such as a PAN of a customer or personally identifiable information of a customer, electronic wallet provider system 110 may communicate the loyalty program identification data without communicating sensitive data.

As further shown in FIG. 3, at step 310, method 300 includes determining whether the second transaction data corresponds to the first transaction data. For example, electronic wallet provider system 110 may determine whether the second transaction data corresponds to the first transaction data based on receiving the second transaction data. In this way, electronic wallet provider system 110 may conserve processing and/or network resources as compared to transaction service provider system 102, issuer system 104, merchant system 108, and/or token service provider system 112 determining whether second transaction data corresponds to first transaction data since electronic wallet provider system 110 may store loyalty program identification data assigned to the first transaction data.

In some non-limiting embodiments, the second transaction data may include historical transaction data associated with a payment transaction (e.g., a prior payment transaction) that has been processed. For example, the second transaction data may include transaction identifier data associated with a transaction identifier of a prior payment transaction.

In some non-limiting embodiments, electronic wallet provider system 110 may receive second transaction data from token service provider system 112. In some non-limiting embodiments, electronic wallet provider system 110 may compare the second transaction data received from token service provider system 112 to the first transaction data. For example, electronic wallet provider system 110 may compare transaction identifier data associated with the second transaction data to transaction identifier data associated with the first transaction data stored in a data structure. If the transaction identifier data associated with the second transaction data is the same as the transaction identifier data associated with the first transaction data, electronic wallet provider system 110 may determine that the second transaction data corresponds to the first transaction data. Additionally, if the transaction identifier data associated with the second transaction data is not the same as the transaction identifier data associated with the first transaction data, electronic wallet provider system 110 may determine that the second transaction data does not correspond to the first transaction data.

In some non-limiting embodiments, electronic wallet provider system 110 may retrieve loyalty program identification data based on electronic wallet provider system 110 determining that the second transaction data corresponds to the first transaction data. For example, electronic wallet provider system 110 may retrieve the loyalty program identification data that is assigned to the first transaction data in the data structure after electronic wallet provider system 110 determines that the second transaction data corresponds to the first transaction data.

As further shown in FIG. 3, at step 312, method 300 includes communicating the loyalty program identification data. For example, electronic wallet provider system 110 may communicate the loyalty program identification data based on determining that the second transaction data corresponds to the first transaction data.

In some non-limiting embodiments, electronic wallet provider system 110 may communicate the loyalty program identification data to transaction service provider system 102, issuer system 104, customer device 106, merchant system 108, and/or token service provider system 112 via network 114. For example, electronic wallet provider system 110 may communicate the loyalty program identification data to transaction service provider system 102, issuer system 104, customer device 106, merchant system 108, and/or token service provider system 112 via network 114 based on determining that the second transaction data corresponds to the first transaction data.

In some non-limiting embodiments, electronic wallet provider system 110 may communicate the loyalty program identification data to token service provider system 112 based on determining that the second transaction data corresponds to the first transaction data. In this way, electronic wallet provider system 110 may reduce network resources associated with communicating the loyalty program identification data to systems and/or devices other than token service provider system 112.

In some non-limiting embodiments, electronic wallet provider system 110 may communicate the loyalty program identification data and transaction data (e.g., the first transaction data) associated with a payment transaction to token service provider system 112. For example, electronic wallet provider system 110 may communicate a message that includes the loyalty program identification data and the transaction data to token service provider system 112 based on determining that the second transaction data corresponds to the first transaction data.

In some non-limiting embodiments, token service provider system 112 may communicate the loyalty program identification data to transaction service provider system 102 based on token service provider system 112 receiving the loyalty program identification data from electronic wallet provider system 110.

In some non-limiting embodiments, token service provider system 112 may communicate the loyalty program identification data and transaction data (e.g., the first transaction data) associated with a payment transaction to transaction service provider system 102. For example, token service provider system 112 may communicate a message that includes the loyalty program identification data and the transaction data to transaction service provider system 102 based on token service provider system 112 receiving the loyalty program identification data and transaction data from electronic wallet provider system 110.

In some non-limiting embodiments, transaction service provider system 102 may store the loyalty program identification data and/or the transaction data in a data structure. For example, transaction service provider system 102 may store the loyalty program identification data and/or the transaction data in a data structure that is operated by and/or accessible by transaction service provider system 102.

In some non-limiting embodiments, transaction service provider system 102 may generate a loyalty history profile (e.g., a loyalty history profile associated with a loyalty rewards program of merchant system 108) for a customer associated with customer device 106 based on receiving the loyalty program identification data for that customer for a plurality of payment transactions. For example, transaction service provider system 102 may generate a loyalty history profile based on a parameter for tracking a customer's progress in a loyalty rewards program (e.g., loyalty rewards points), a total amount spent during payment transactions involving a merchant associated with merchant system 108, a total number of payment transactions involving a merchant associated with merchant system 108, a total amount spent and/or a total number of transactions relating to one or more specified products, and/or the like.

In some non-limiting embodiments, transaction service provider system 102 may communicate data regarding the loyalty history profile to issuer system 104, customer device 106, merchant system 108, token service provider system 112, and/or electronic wallet provider system 110 based on receiving data regarding a subsequent transaction involving the customer associated with customer device 106 and a merchant associated with merchant system 108. In further non-limiting embodiments, issuer system 104, customer device 106, merchant system 108, token service provider system 112, and/or electronic wallet provider system 110 may take an action based on receiving the data regarding the loyalty history profile. For example, customer device 106 may display an indication on an interface of a metric associated with a loyalty rewards program. In further examples, issuer system 104, merchant system 108, token service provider system 112, and/or electronic wallet provider system 110 may communicate one or more promotional materials (e.g., coupons, advertisements, and/or notifications), for example, to the customer associated with customer device 106 and/or to a merchant associated with merchant system 108 and/or to another merchant which may be interested in providing targeted promotions or the like to the customer associated with customer device 106 based on receiving the data regarding the loyalty history profile. In further examples, issuer system 104, merchant system 108, token service provider system 112, and/or electronic wallet provider system 110 may provide the customer associated with customer device 106 with a benefit (e.g., a discount, loyalty rewards points, a coupon, and/or the like) based on receiving the data regarding the loyalty history profile.

Figure 4A:
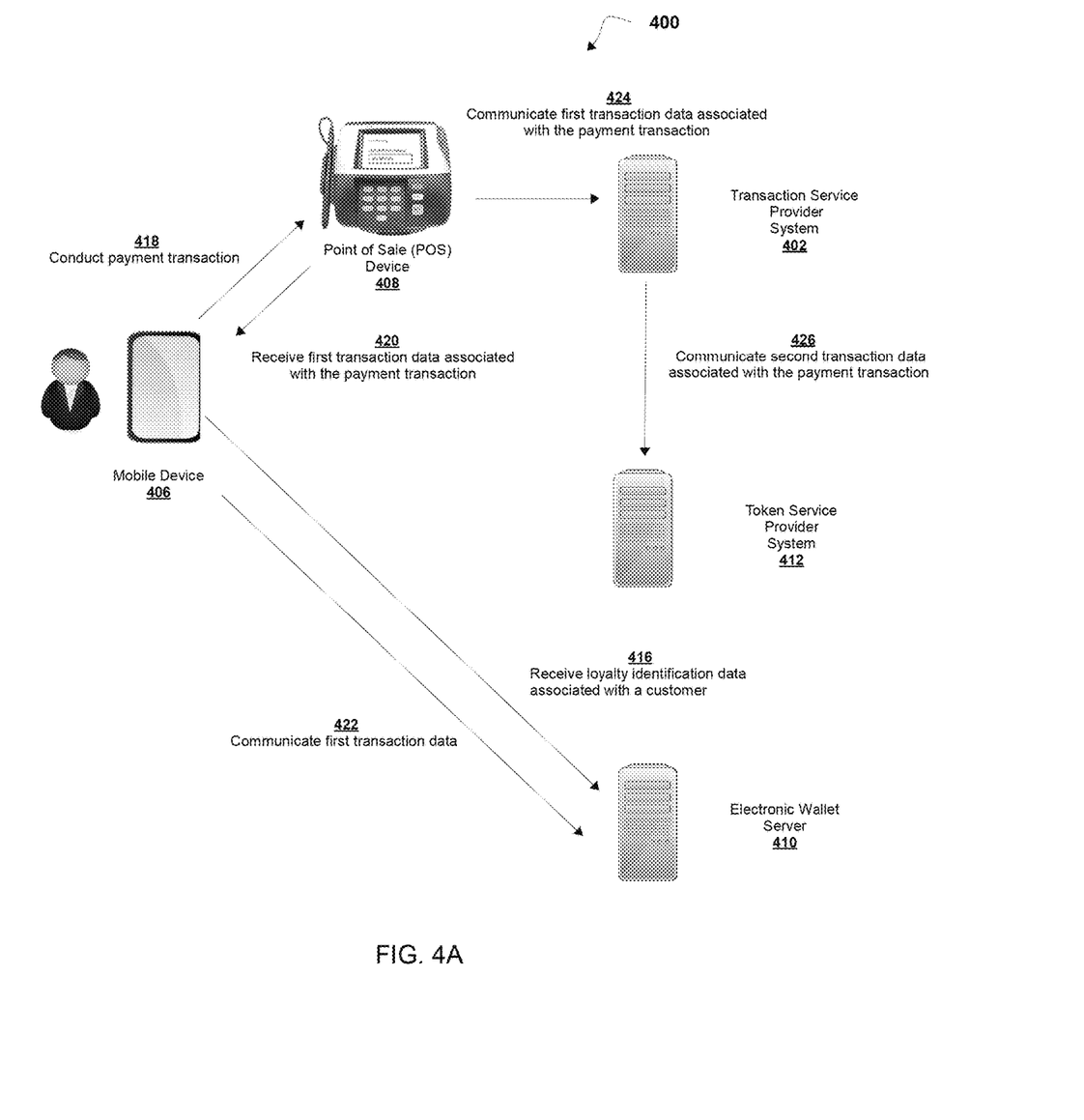
FIGS. 4A-4B are diagrams of an implementation of a non-limiting embodiment of the method shown in FIG. 3.
Figure 4B:
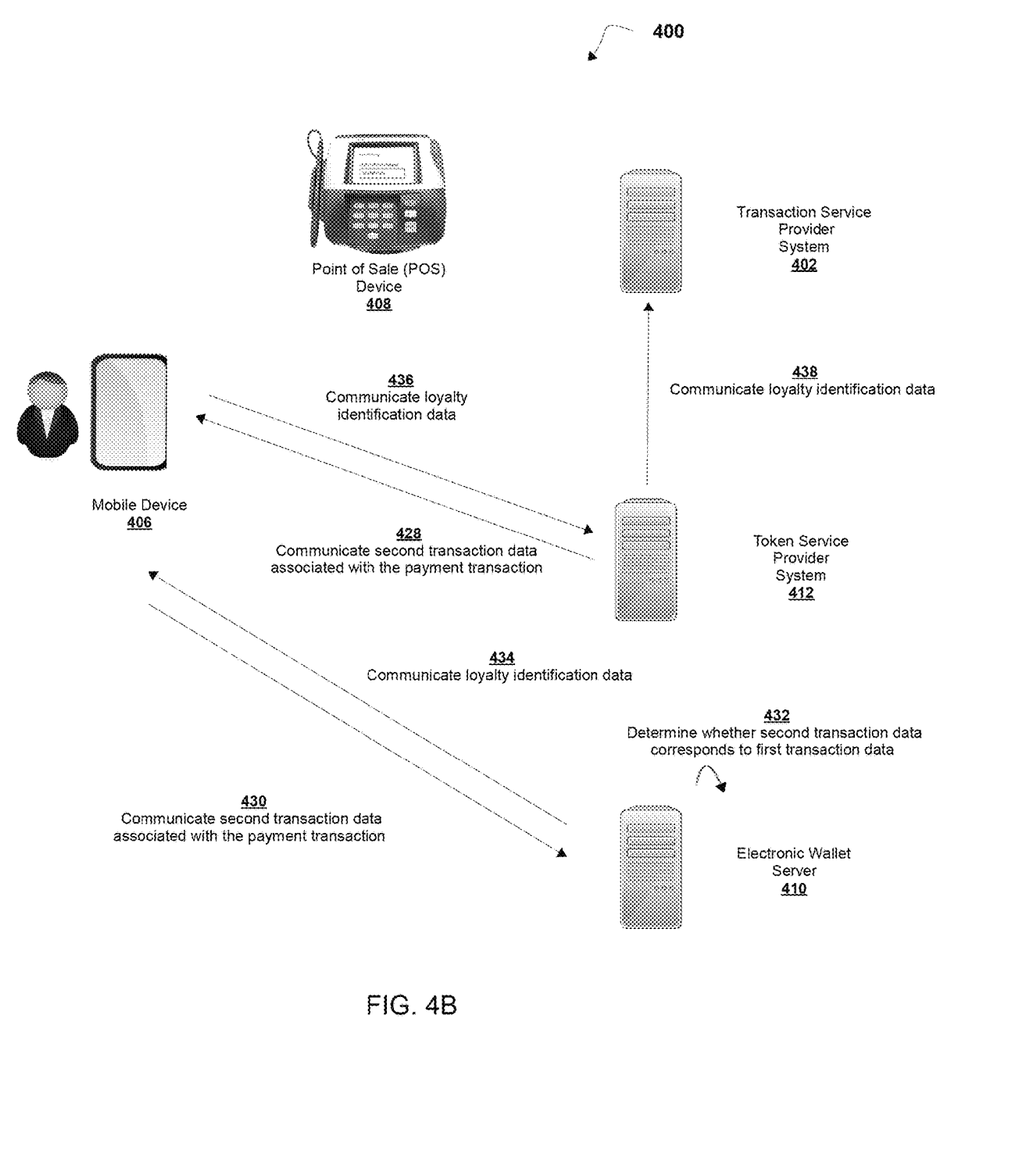

FIGS. 4A-4B are diagrams of a non-limiting embodiment of an implementation 400 relating to method 300 shown in FIG. 3. As shown in FIGS. 4A-4B, implementation 400 may include transaction service provider system 402, mobile device 406, POS device 408, electronic wallet provider server 410, and/or token service provider system 412. In some non-limiting embodiments, transaction service provider system 402 may the same as or similar to transaction service provider system 402 as described above, mobile device 406 may be the same as or similar to customer device 106 as described above, POS device 408 may be the same as or similar to merchant system 108 as described above, electronic wallet provider server 410 may be the same as or similar to electronic wallet provider system 110 as described above, and token service provider system 412 may be the same or similar as token service provider system 112 as described above.

As shown by reference number 416 in FIG. 4A, electronic wallet provider server 410 may receive loyalty program identification data associated with a loyalty program identifier for a customer (e.g., a customer associated with mobile device 406) from mobile device 406 via application on mobile device 406. As shown by reference number 418, a customer associated with mobile device 406 may conduct a payment transaction with POS device 408 via the application (e.g., an electronic wallet provider application) on mobile device 406. In some non-limiting embodiments, mobile device 406 may receive a token (e.g., a device-bound token) from token service provider system 412 before conducting the payment transaction. In some non-limiting embodiments, mobile device 406 may store the token in a local memory on mobile device 406. In some non-limiting embodiments, electronic wallet provider server 410 may communicate the token to mobile device 406 before and/or during a payment transaction. In some non-limiting embodiments, mobile device 406 may communicate the token (e.g., a device-bound token stored on mobile device 406) to POS device 408 during the payment transaction.

As shown by reference number 420, mobile device 406 may receive first transaction data associated with the payment transaction from POS device 408. In some non-limiting embodiments, the first transaction data may include transaction identifier data associated with a transaction identifier of the payment transaction and/or the token from mobile device 406. As shown by reference number 422, mobile device 406 may communicate the first transaction data associated with the payment transaction to electronic wallet provider server 410. In some non-limiting embodiments, electronic wallet provider server 410 may store the first transaction data in a data structure. As shown by reference number 424, POS device 408 may communicate the first transaction data to transaction service provider system 402 during the payment transaction.

As shown by reference number 426, transaction service provider system 402 may communicate second transaction data associated with the payment transaction to token service provider system 412. In some non-limiting embodiments, transaction service provider system 402 may communicate the second transaction data to token service provider system 412 based on transaction service provider system 402 identifying token service provider system 412. For example, transaction service provider system 402 may communicate the second transaction data based on identifying token service provider system 412 using the token from mobile device 406 included in the first transaction data. In some non-limiting embodiments, the second transaction data may be the same as the first transaction data. For example, the second transaction data may include the transaction identifier data associated with the transaction identifier of the payment transaction and/or the token from mobile device 406.

As shown by reference number 428 in FIG. 4B, token service provider system 412 may communicate the second transaction data associated with the payment transaction to mobile device 406. In some non-limiting embodiments, token service provider system 412 may communicate the second transaction data to mobile device 406 based on token service provider system 412 identifying mobile device 406. For example, token service provider system 412 may communicate the second transaction data based on identifying mobile device 406 using the token from mobile device 406 included in the second transaction data.

As shown by reference number 430, mobile device 406, via the application on mobile device 406, may communicate the second transaction data associated with the payment transaction to electronic wallet provider server 410. As shown by reference number 432, electronic wallet provider server 410 may determine whether the second transaction data corresponds to the first transaction data. In some non-limiting embodiments, electronic wallet provider server 410 may compare the second transaction data to the first transaction and determine that the second transaction data is the same as the first transaction data. For example, electronic wallet provider server 410 may compare transaction identifier data associated with a transaction identifier of a payment transaction received from mobile device 406 to transaction identifier data associated with a transaction identifier of a payment transaction stored by electronic wallet provider server 410 in a data structure. Electronic wallet provider server 410 may determine that the transaction identifier from mobile device 406 is the same as the transaction identifier stored in the data structure.

As shown by reference number 434, electronic wallet provider server 410 communicates the loyalty program identification data associated with the loyalty program identifier to mobile device 406 via the application based on determining that the second transaction data corresponds to the first transaction data. As shown by reference number 436, mobile device 406 (e.g., via the application on mobile device 406) communicates the loyalty program identification data associated with the loyalty program identifier to token service provider system 412 based on receiving the loyalty program identification data from electronic wallet provider server 410. As shown by reference number 438, token service provider system 412 communicates the loyalty program identification data to transaction service provider system 402 based on receiving the loyalty program identification data from token service provider system 412.

Although the invention has been described in detail for the purpose of illustration based on what are currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for communicating loyalty program identification data associated with at least one payment transaction, comprising:

receiving, with at least one processor of a customer device of a customer, a device-bound token from a token service provider system;

transmitting, with at least one processor of the customer device, the device-bound token to a point-of-sale (POS) device associated with a merchant to conduct at least one payment transaction involving the customer and the merchant;

transmitting, with at least one processor of the customer device, loyalty program identification data associated with a loyalty program identifier from the customer device to an electronic wallet system, the loyalty program identification data comprising the device-bound token;

receiving, with at least one processor of an electronic wallet system, the loyalty program identification data comprising the device-bound token from the customer device;

receiving, with at least one processor of the customer device, first transaction data associated with the at least one payment transaction involving the customer and the merchant from the POS device associated with the merchant, wherein the first transaction data comprises the device-bound token associated with the customer device and wherein the POS device does not transmit the loyalty program identification data comprising the device-bound token to a transaction service provider system;

transmitting, with at least one processor of the customer device, the first transaction data to the electronic wallet system via an application located on the customer device based on receiving the first transaction data from the POS device;

receiving, with at least one processor of the electronic wallet system, the first transaction data comprising the device-bound token from the customer device of the customer;

assigning, with at least one processor of the electronic wallet system, the loyalty program identification data comprising the device-bound token to the first transaction data based on receiving the first transaction data;

receiving, with at least one processor of the customer device, second transaction data associated with the at least one payment transaction involving the customer and the merchant from the token service provider system, the second transaction data comprising the device-bound token;

transmitting, with at least one processor of the customer device, the second transaction data to the electronic wallet system via the application located on the customer device based on receiving the second transaction data from the token service provider system;

receiving, with at least one processor of the electronic wallet system, the second transaction data comprising the device-bound token from the customer device of the customer, wherein the second transaction data is received after the first transaction data is received;

determining, with at least one processor of the electronic wallet system, whether the second transaction data corresponds to the first transaction data based on comparing the device-bound token included in the first transaction data and the device-bound token included in the second transaction data;

transmitting, with at least one processor of the electronic wallet system, the loyalty program identification data comprising the device-bound token to the customer device for transmitting the loyalty program identification data comprising the device-bound token to the token service provider system based on determining that the second transaction data corresponds to the first transaction data;

receiving, with at least one processor of the customer device, the loyalty program identification data comprising the device-bound token from the electronic wallet system; and transmitting, with at least one processor of the customer device, the loyalty program identification data comprising the device-bound token to the token service provider system based on receiving the loyalty program identification data comprising the device-bound token from the electronic wallet system.

2. The computer-implemented method of claim 1, further comprising:

storing the loyalty program identification data comprising the device-bound token and the first transaction data in a data structure based on assigning the loyalty program identification data comprising the device-bound token to the first transaction data.

3. The computer-implemented method of claim 1, further comprising:

transmitting, with at least one processor of the token service provider system, the loyalty program identification data comprising the device-bound token to a transaction service provider system after determining that the second transaction data corresponds to the first transaction data.

4. The computer-implemented method of claim 1, wherein the first transaction data comprises a transaction identifier of the at least one payment transaction and the second transaction data comprises the transaction identifier of the at least one payment transaction.

5. The computer-implemented method of claim 1, wherein the first transaction data comprises a merchant-bound token.

6. A system for communicating loyalty program identification data associated with at least one payment transaction, comprising:

a customer device of a customer; and
an electronic wallet system,
wherein the customer device comprises at least one first processor configured or programmed to:
receive a device-bound token from a token service provider system;
transmit the device-bound token to a point-of-sale (POS) device associated with a merchant to conduct at least one payment transaction involving the customer and the merchant;
transmit loyalty program identification data associated with a loyalty program identifier from the customer device to the electronic wallet system, the loyalty program identification data comprising the device-bound token;
receive first transaction data associated with the at least one payment transaction involving the customer and the merchant from the POS device associated with the merchant, wherein the first transaction data comprises the device-bound token associated with the customer device and wherein the POS device does not transmit the loyalty program identification data comprising the device-bound token to a transaction service provider system;
transmit the first transaction data to the electronic wallet system via an application located on the customer device based on receiving the first transaction data from the POS device;
receive second transaction data associated with the at least one payment transaction involving the customer and the merchant from the token service provider system, the second transaction data comprising the device-bound token; and
transmit the second transaction data to the electronic wallet system via the application located on the customer device based on receiving the second transaction data from the token service provider system;

wherein the electronic wallet system comprises at least one second processor configured or programmed to:
receive the loyalty program identification data comprising the device-bound token from the customer device;
receive the first transaction data comprising the device-bound token from the customer device after receiving the loyalty program identification data comprising the device-bound token;
assign the loyalty program identification data comprising the device-bound token to the first transaction data based on receiving the first transaction data;
receive the second transaction data comprising the device-bound token from the customer device, wherein the second transaction data is received after the first transaction data is received;
determine that the second transaction data corresponds to the first transaction data based on comparing the device-bound token included in the first transaction data and the device-bound token included in the second transaction data; and
transmit the loyalty program identification data comprising the device-bound token to the token service provider system via the customer device, and wherein the at least one first processor of the customer device is further configured or programmed to:
receive the loyalty program identification data comprising the device-bound token from the electronic wallet system; and
transmit the loyalty program identification data comprising the device-bound token to the token service provider system based on receiving the loyalty program identification data comprising the device-bound token from the electronic wallet system.

7. The system of claim 6, wherein the at least one second processor of the electronic wallet system is further configured or programmed to:

store the loyalty program identification data comprising the device-bound token associated with the loyalty program identifier of the customer and the first transaction data in a data structure based on assigning the loyalty program identification data comprising the device-bound token to the first transaction data.

8. The system of claim 6, wherein, when transmitting the loyalty program identification data comprising the device-bound token, the at least one second processor of the electronic wallet system is configured or programmed to:

transmit the loyalty program identification data comprising the device-bound token and the first transaction data to the token service provider system based on determining that the second transaction data corresponds to the first transaction data.

9. The system of claim 6, wherein the first transaction data comprises a transaction identifier of the at least one payment transaction and/or the second transaction data comprises the transaction identifier of the at least one payment transaction.

10. The system of claim 6, wherein, when transmitting the loyalty program identification data comprising the device-bound token, the at least one second processor of the electronic wallet system is configured or programmed to:

transmit the loyalty program identification data comprising the device-bound token and the first transaction data to a transaction service provider system based on determining that the second transaction data corresponds to the first transaction data.

11. The system of claim 6, wherein the at least one second processor of the electronic wallet system is configured or programmed to:

transmit the loyalty program identification data comprising the device-bound token to a transaction service provider system based on determining that the second transaction data corresponds to the first transaction data.

\* \* \* \* \*